Aug. 10, 1937.   J. F. KNAPP   2,089,485
EARTH MOVER
Filed March 27, 1934
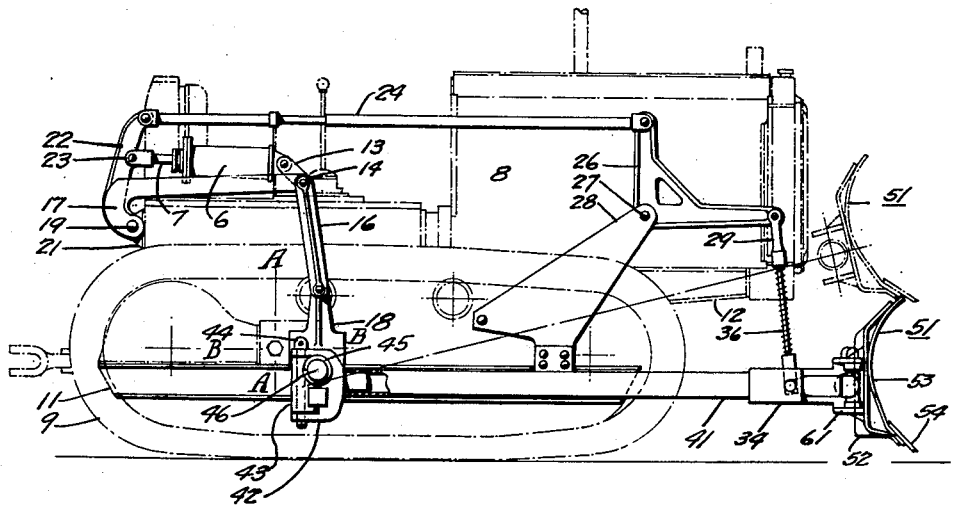
FIG_1_
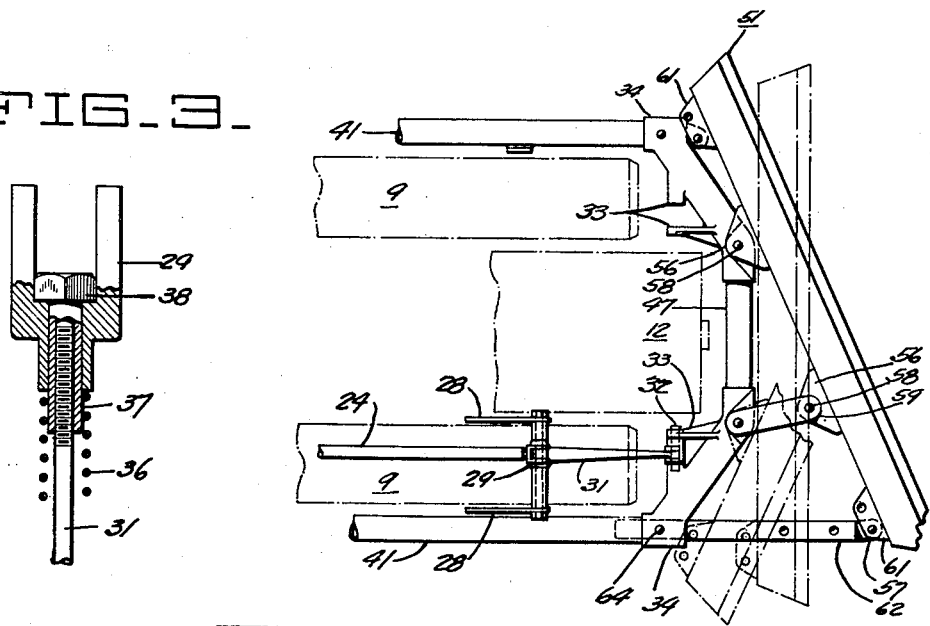
FIG_3_
FIG_2_
INVENTOR
John F. Knapp
BY
Robert H. Eckhoff
ATTORNEY Patented Aug. 10, 1937

2,089,485

UNITED STATES PATENT OFFICE 2,089,485

EARTH MOVER

John F. Knapp, Oakland, Calif., assignor to American Tractor Equipment Corporation, a corporation of California Application March 27, 1934, Serial No. 717,592

4 Claims. (Cl. 37—144)

My invention relates to machinery useful in conjunction with earth moving, excavating, grading and the like, and is especially concerned with an apparatus adapted to be propelled by a vehicle such as a tractor, and to be controlled by the operator of the tractor.

An object of my invention is to provide an earth mover of large capacity and correspondingly of considerable ruggedness.

Another object of my invention is to provide an earth mover carried by a tractor in such a manner that the load placed on the tractor is carried in the main directly by the truck frames rather than through the equalizer bar or spring.

An additional object of my invention is to provide an earth mover carried by a tractor almost directly beneath the forward end thereof to shorten the moment arm of the mover on the tractor.

A further object of my invention is to provide an earth mover which can be readily adjusted in various positions.

The foregoing and other objects are attained in the embodiment of the invention shown in the drawing, in which Figure 1 is a side elevation of a tractor carrying one form of earth mover of my invention.

Figure 2 is a plan view of the forward end of the tractor and earth mover.

Figure 3 is a section through a connection for lifting and lowering the earth mover.

In the form shown in the drawing there is disclosed a mechanism adapted to be actuated by a hydraulic displacement mechanism, including cylinders 6 and piston rods 7, deriving its power from a pump unit mounted on tractor 8. The tractor includes opposite tracks 9 carried by truck frames 11 which also carry a main frame, generally indicated by 12, pivoted at the rear of the truck frames for rotation about a hinge point at the intersection of lines A—A and B—B in Figure 1. This construction is well known in the "Caterpillar" type tractors wherein the truck frames are hinged at their rear ends on axles extending from the transmission case of the main frame. The main frame is supported at the forward end of said frames by an equalizer bar, usually a heavy spring (not shown). Since this part of the disclosure is conventional and has only an indirect bearing on the present invention, the showing in the drawing is purposely schematic, reference being made to the prior art for constructional details of this type of tractor. See for example the patent to Whitacre No. 1,744,516 issued January 21, 1930.

Each cylinder 6, there being one on each side of the tractor, is connected by a link 13 to a pin 14 which also carries a link 16. Link 13 and curved link 17 are welded together. These links and link 16, as previously mentioned, are connected by pin 14 which hinges links 16 and 17 together. The link 16 is connected to a bracket 18 mounted on the truck frame while the curved link 17 has a shaft 19 passing through its curved end. This shaft 19 is supported in brackets 21 on the main frame and keyed to the shaft are arms 22 to which the piston rods 7 are connected by bifurcated clevises 23.

Links 24, adjustable in length, extend forwardly from arms 22 to one arm of bellcranks 26 and serve to rock bell cranks 26 about pins 27 which support them on plate brackets 28 on the truck frames. Clevises 29 are secured to the other arm of the bellcranks. Rods 31 slide through the clevises and are secured by pins 32 between extensions 33 on angle frame members 34. Each rod 31 is surrounded by a spring 36 compressed thereon between the clevis 29 and the other end of the rod. Each rod has an internally threaded sleeve 37 thereon sliding in the clevis, the end of the sleeve having a head 38 thereon sliding in the clevis and acting as a guide between the rod and the clevis. Any upward push on the rods compresses the springs additionally while the head 38 on the sleeves permits the rods to be lifted positively. In this manner, a flexible connection is provided protecting the lifting and lowering mechanism as will appear further.

A tube 41 is provided on each side of the tractor alongside the truck frames. One end of each tube is received by and is welded to a collar on angle frame members 34 while the other end carries a fork casting 42 having an upper and lower slot formed therein. A member 43 is receivable in each casting 42 and is held in place by pin 44. This member completes the slots in the casting 42 and confines a stub shaft 46 in either slot. The stub shaft is mounted in a suitable bearing box 45 carried in either slot in the bracket 18 on the truck frame (see Figure 3 in my copending application Serial No. 49,255, filed November 11, 1935). This bracket is mounted on the truck frame as close to the pivot point of the truck on the main frame as the tractor construction permits. (A bracket and stub shaft construction is shown as 96 and 97 in Figure 9 of Buffington Patent 1,859,496 of May 24, 1932.)

The angle frame connectors, or members 34, are joined together by a short tube 47 welded to them. The tubes 41, the members 34, and the short tube provide a very strong and rigid U-frame which can be manipulated by rocking of bell cranks 26. This frame lies practically beneath the tractor radiator so that any load placed thereon is carried close in to the tractor; the turning moment of the load is therefore minimized.

This strong and rigid frame is utilized as support for a mold board 51. This board, as is disclosed in the Patent 1,928,778 to Austin, is composed of a plurality of component parts, primarily a back plate 52, so formed that it is a channel in cross section and carries a front plate 53 of arcuate cross section. In addition, a replaceable cutting blade 54 is suitably secured to the forward lower edge of the plate 53.

Secured to the back plate 52 are two brackets 56 and two other brackets 61. Brackets 56 receive pins 58 which also pass through frame connection members 34, when the mold board is transverse of the tractor. When the mold board is in either of the angular positions of Figure 2, a connecter 59 is inserted between the member 34 and the spaced bracket on the mold board.

Additional support for the mold board is provided at each end thereof by brackets 61 and members 62 in the form of tubes which are slidable in tubes 41. Each tube carries an end casting 57 at the end thereof having an off-set aperture therein which is engaged by a pin passed through one of the two holes in brackets 61. When the mold board is in the full line position of Figure 2, both end castings are turned in, the left one to engage the pin passed through the inner hole in the associated bracket, and the right one to engage a pin in the outer hole. When the mold board is straight across, the end castings are both turned out to receive pins passed through the inner holes. The path of center of each inner hole is beyond the line of center of the rod by the amount of offset of the aperture in each end casting. Pins 64 are passed through each collar, tube 41 and apertured tube 62 to secure the tube 62.

The frame fork castings 42 can be raised or lowered so that bearing boxes 45 for stub shafts 46 can be located either in the upper or the lower slots to vary the angle of the mold board or in an upper slot on one side and a lower slot on the other to give an angle to the mold board. To do this it is merely necessary to lower the mold board onto the ground, pull pins 44, back the tractor away to remove the stub shafts from the slots, raise or lower the frame as desired, and then move the tractor forward and carry the stub shafts into the desired slots in the fork castings 42, or the device may be entirely disconnected from the tractor by removing pins 32 and 44 and backing the tractor, as mentioned.

It is to be noted that in the main the earth mover is carried on the truck frames and that whatever load of the earth mover is placed on the main frame is at a point to the rear of the equalizer bar.

Instead of utilizing hydraulic mechanism and a pump, electric power can be used as is disclosed in the aforementioned Austin patent.

It is to be noted that tubes 41, 62, and 47 and connections 34 form a U-frame rather than a V or an A frame. This form of the frame enables the tool as the mold board or other earth moving or displacing means, to be carried very close in to the dirigible vehicle as well as to permit the tool to be secured to the frame rigidly even though the position of the tool on the frame can be adjusted. In practice, this construction has proven of utility and advantage.

I claim:

1. In an earth moving device including a tractor and tractor supporting means having a truck frame hinged adjacent the rear end thereof on each side of said tractor, earth moving means, frame means supporting said earth moving means on said tractor, means for raising and lowering said frame means to raise and lower said earth moving means with respect to the earth, said raising and lowering means including a pair of hydraulic cylinders and pistons and piston rods, a bellcrank supported on each truck frame adjacent the front end thereof, linkage connecting an arm of each bellcrank to said frame means, other linkage connecting each piston rod to an associated bellcrank over each truck frame, and means supporting each cylinder over each truck frame including a bracket secured to each truck frame closely adjacent the hinge point thereof on the tractor, a link extending upwardly from said bracket, a second link hinged on the tractor and on said link, and means mounting a cylinder on the hinged links.

2. In a device of the character described, having a tractor and opposite truck frames hinged on said tractor, means for mounting a cylinder over a truck frame hinged on said tractor, said mounting means including a bracket on each truck frame closely adjacent the hinge point of each truck frame on said tractor, a hydraulic cylinder over each truck frame, a first link hinged on each bracket and extending upwardly, a second link hinged on said tractor and on the first link, and means mounting a cylinder on said links.

3. In an earth moving device including a tractor having a main frame and a truck frame hinged on said main frame, an earth moving means carried in front of said tractor, means for raising and lowering said earth moving means including a bell crank supported on said truck frame adjacent the front end thereof, linkage connecting an arm of said bell crank to said earth moving means, a hydraulic cylinder and piston and piston rod, means supporting said cylinder upon both said main frame and said truck frame whereby movements of said truck frame about its hinge are not communicated to said cylinder, and means operatively connecting said piston rod to said bell crank whereby movement of said rod is effective to rotate said bell crank.

4. In an earth moving device including a tractor having a main frame and a truck frame on each side thereof hinged on said main frame, an earth moving means carried in front of said tractor, a pair of spaced plates mounted on each side of each truck frame, a bellcrank supported between each plate pair, a link connecting an arm of said bellcrank to said earth moving means, a hydraulic cylinder and piston including a piston rod positioned over each truck frame, linkage connecting said piston rod to the other arm of an associated bellcrank, and means supporting each cylinder over each truck frame independently of the other cylinder and substantially independently of movement of a truck frame about its hinge on the main frame, said supporting means including a pair of hingedly connected links for each cylinder, one end of one link being hinged on the tractor while one end of the other link is hinged on a truck frame closely adjacent the hinge point of the truck on the tractor.

JOHN F. KNAPP.